(12) United States Patent
Semelka

(10) Patent No.: US 6,914,401 B2
(45) Date of Patent: Jul. 5, 2005

(54) SENSOR ARRANGEMENT FOR MONITORING A SPATIAL AREA

(75) Inventor: Wolfgang Semelka, Witten (DE)

(73) Assignee: Dorma GmbH + Co. KG, Ennepetal (DE)

( * ) Notice: Subject to any disclaimer, the term of this patent is extended or adjusted under 35 U.S.C. 154(b) by 0 days.

(21) Appl. No.: 10/475,741
(22) PCT Filed: Jun. 19, 2002
(86) PCT No.: PCT/EP02/06812
§ 371 (c)(1), (2), (4) Date: Oct. 23, 2003
(87) PCT Pub. No.: WO02/103400
PCT Pub. Date: Dec. 27, 2002

(65) Prior Publication Data
US 2004/0113577 A1 Jun. 17, 2004

(30) Foreign Application Priority Data
Jun. 19, 2001 (DE) .......................... 101 29 230

(51) Int. Cl.⁷ .......................... H02P 7/00; G08B 13/18; E05F 15/20
(52) U.S. Cl. .......................... 318/480; 250/221; 340/550; 340/555; 49/25; 49/31
(58) Field of Search .......................... 318/480, 450, 318/467; 250/221, 559.11; 340/556, 514, 550, 552, 555; 49/25, 26, 28, 31

(56) References Cited

U.S. PATENT DOCUMENTS

| | | | | |
|---|---|---|---|---|
| 4,467,251 A | | 8/1984 | Jönsson | |
| 4,577,437 A | * | 3/1986 | Gionet et al. | 318/480 |
| 4,851,746 A | * | 7/1989 | Milke | 318/480 |
| 4,888,532 A | * | 12/1989 | Josson | 318/480 |
| 5,015,840 A | * | 5/1991 | Blau | 250/221 |
| 5,142,152 A | * | 8/1992 | Boiucaner | 250/221 |
| 5,583,334 A | | 12/1996 | Baumann | |
| 5,801,376 A | | 9/1998 | Haberl et al. | |
| 5,828,302 A | * | 10/1998 | Tsutsumi et al. | 340/556 |
| 5,963,000 A | * | 10/1999 | Tsutsumi et al. | 318/480 |
| 6,080,981 A | | 6/2000 | Payne | |
| 6,750,441 | * | 6/2004 | Imahori et al. | 250/221 |
| 6,782,660 | * | 8/2004 | Takada et al. | 49/25 |

FOREIGN PATENT DOCUMENTS

| | | |
|---|---|---|
| DE | 199 36 441 | 3/2001 |
| GB | 2 227 309 | 7/1990 |

* cited by examiner

Primary Examiner—Edgardo San Martin
(74) Attorney, Agent, or Firm—Cohen, Pontani, Lieberman & Pavane

(57) ABSTRACT

A sensor arrangement for monitoring a spatial area of least one motor-driven wing of a door includes a plurality of primary transmitters emitting beams of radiation toward a spatial area, and a plurality of primary receivers arranged to receive radiation from the primary transmitters which is reflected in the spatial area, the receivers generating a signal to actuate the motor driving the wing. A plurality of auxiliary transmitters are arranged next to respective primary receivers and emit auxiliary beams of radiation toward the spatial area, and a plurality of auxiliary receivers are arranged next to the primary transmitters to receive radiation from the auxiliary transmitters. A transmitter emits radiation and a receiver reacts to a reflection of the beam differing in intensity and produces a signal which controls the actuation of the door. Each transmitter is associated with an auxiliary receiver and each receiver is associated with an auxiliary transmitter in order to develop a sensor arrangement with increased security and reliability.

11 Claims, 3 Drawing Sheets

SENSOR ARRANGEMENT FOR MONITORING A SPATIAL AREA

PRIORITY CLAIM

This is a U.S. national stage of application No. PCT/EP02/06812, filed on 19 Jun. 2002. Priority is claimed on that application and on the following application: Country: Germany, Application No.: 101 29 230.9, Filed: 19 Jun. 2001.

BACKGROUND OF THE INVENTION

1. Field of the Invention

The invention pertains to a sensor arrangement for monitoring an area of the space in front of at least one motorized wing of a door. Transmitters emit radiation, whereas receivers react to the differing intensities at which this radiation is reflected and thus generate a signal which controls the drive of the door.

2. Description of the Related Art

U.S. Pat. No. 4,467,251 describes in detail a photoelectric device, which can be installed to serve as a sensor device in, for example, the bar handle of a door wing in order to monitor the space in front of the wing. The sensor arrangement has a housing, extending in the form of a bar across the entire width of the wing; a large number of beam-emitting and beam-sensitive sensors are arranged next to each other in linear fashion in this housing. The beams, preferably light beams, are emitted in an approximately horizontal direction, so that, when the power of the emitted light is adjusted properly and the sensitivity of the elements which receive the light is adjusted properly, an area of the space near the wing extending approximately at the level of the bar handle is monitored. This arrangement suffers from the disadvantage that the monitored spatial area does not extend all the way to the floor, which means that small children, for example, can creep under the monitored space and would be in danger of being hit by the wing of the door, if it were to open.

The previously known idea of combining transmitters and receivers to form a compact, bar-shaped module is also disadvantageous in that the functionality of the individual sensors cannot be tested. A defective module can be determined only on the basis of a deviation of parameters of the entire module from a reference value. An evaluation of this type, however, is unsatisfactory, because the result obtained does not indicate the exact source of the defect, which could even be caused by external influences. It is impossible to know which individual sensor, if any, is defective. It is extremely important to have this knowledge, however, because these types of units have important, safety-relevant functions, and a malfunction or a complete failure of certain individual sensors can in the extreme case result in injury to the person passing through the door system or can have even more far-reaching consequences in an emergency situation such as a fire.

SUMMARY OF THE INVENTION

It is therefore the task of the invention to develop a sensor arrangement which offers increased safety and reliability.

The task is accomplished in that the functionality of each individual sensor can be checked by assigning an auxiliary receiver to each individual transmitter and an auxiliary transmitter to each individual receiver. As a result, concrete information can be derived at any time concerning the functionality of each individual sensor. When a defect occurs, an arrangement such as this makes it possible for a precise error message to be sent, so that the source of the defect can be quickly and uniquely localized.

The transmitters and their auxiliary receivers are preferably arranged next to each other. It is advantageous to embed this linear arrangement of the components in a casting material so that they are held in place. A module with this design can be housed in an extruded section, which is mounted in turn horizontally on the wing of a door and which can swivel around its longitudinal axis. The same arrangement is provided for the receivers and their auxiliary transmitters.

The modular arrangement of the sensors makes it possible to prefabricate most of the system. In addition, the modules can be checked independently of each other to verify that they are functioning properly, and, as a result of the way in which the auxiliary transmitters and auxiliary receivers are arranged, each sensor can be tested individually. In a preferred embodiment, the sensors are designed so that they can be replaced within their module. The individual sensors are mounted detachably in appropriate sockets inside a module body.

So that an area extending both in the widthwise and in the depthwise direction can be monitored, the adjacent transmitters are designed and spaced in such a way that their beams diverge and overlap each other at a desired minimum distance from the object to be scanned. The object to be scanned is therefore subjected simultaneously to radiation from various directions, i.e., in effect by diffuse radiation, and the object can therefore reflect the radiation in a similarly diffuse manner, even if it has pronounced light-reflecting properties. The adjacent receivers can have viewing windows which diverge and overlap each other at the desired minimum distance from the object to be scanned. The receivers can thus reliably detect the radiation being reflected in various directions by the object to be scanned.

In the arrangement according to the invention, the sensor modules or their housings can slant at different angles to the plane of the wing, so that the monitored field in front of the door can have practically any desired form. This is important in cases where interfering objects such as built-in cabinets or the like are present in the monitored area. By aiming the sensor modules appropriately, it is possible to keep these objects from entering the visual field of the sensors when the wing moves and thus to prevent them from stopping the door from swinging open any farther.

In a preferred embodiment, the sensor modules are arranged on support elements, which are connected to the modules. These support elements can be inserted in an extruded section, which can be attached to the wing at a variable angle with respect to the plane of the wing.

In a preferred embodiment, a transmitter bar of this type and a receiver bar of this type are installed horizontally, one above the other, a short distance apart on the bottom of the door, for example. As a result, it is ensured that anyone, including children, in the area of the door will be detected. Installation on the bottom of the door also offers the advantage that there are no complicated or bulky, projecting elements to be seen. It is not necessary to modify the basic design of the wing in any way.

In another application, the transmitter and receiver bars in question can be mounted on both sides of the wing. One device serves to open the wing when a person approaches the wing from one side and enters the scanning range, whereas the other device prevents the wing from opening when another person or object is in the scanning range of the device mounted on the other side of the wing.

BRIEF DESCRIPTION OF THE DRAWINGS

In the following description, the invention is explained in greater detail on the basis of an exemplary embodiment.

DETAILED DESCRIPTION OF THE PRESENTLY PREFERRED EMBODIMENTS

Figure 1:
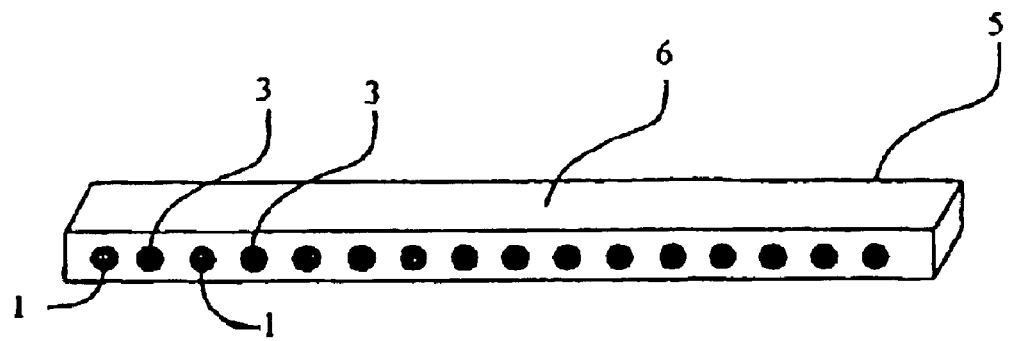
FIG. 1 shows a schematic diagram of a sensor module.

The same or equivalent components are provided in the following description with the same reference numbers.

The sensor arrangement according to the invention consists of a plurality of light-emitting semiconductor elements, so-called light-emitting diodes, as transmitters 1, and a plurality of photosensitive semiconductor elements such as phototransistors as receivers 2. Both the transmitters 1 and the receivers 2 can be of conventional design and are arranged in each case in a single row, one next to the other. Within a strip-like arrangement of this sort, an auxiliary receiver 3 in the form of a phototransistor is assigned to each transmitter 1, and an auxiliary transmitter 4 in the form of a photodiode is assigned to each receiver 2.

Several transmitters 1 and their auxiliary receivers 3 are preferably mounted adjacent to each other and thus combined into a transmitter module 5 (FIG. 1). The components are advantageously embedded in a casting compound 6 and thus held in place with respect to each other. The transmitter module 5 designed in this way is mounted in an extruded section 7, which is mounted in turn on the motorized wing 8 of a door. The module can be swiveled around its longitudinal axis. A transmitter module 5 thus mounted inside the extruded section 7 forms a prefabricated transmitter bar 9, which, depending on the local conditions, can also be mounted on the wing 8 after the door has been installed.

Figure 2:
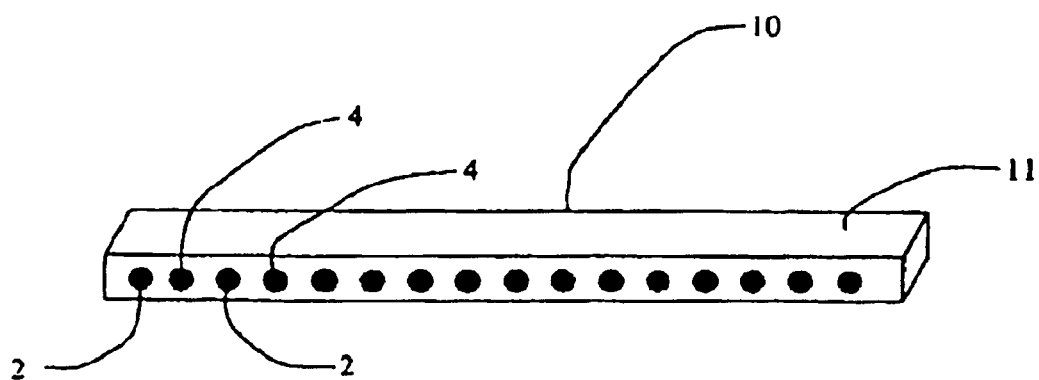
FIG. 2 shows a schematic diagram of a receiver module.

In the same way, several receivers 2 and their auxiliary transmitters 4 are arranged next to each other and thus combined into a receiver module 10 (FIG. 2). The components are also embedded in a casting compound 11 and thus held in place with respect to each other. The receiver module 10 designed in this way is also mounted in an extruded section 7, which is itself mounted horizontally on the wing 8 and can be swiveled around its longitudinal axis.

Figure 3:
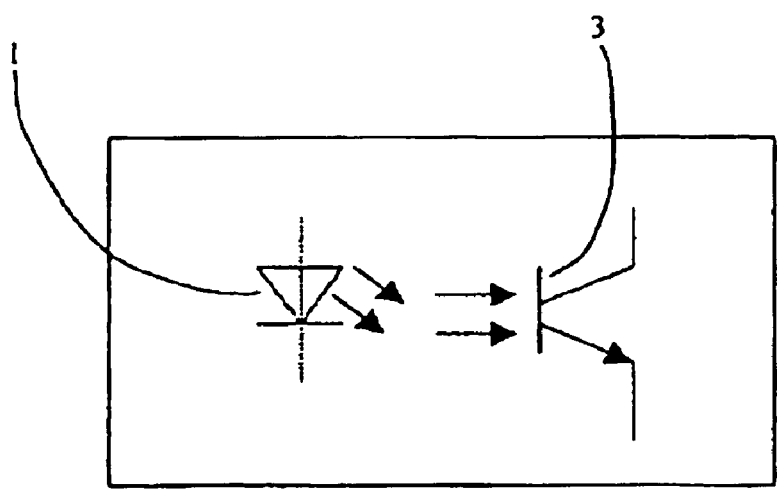
FIG. 3 shows part of the circuit diagram of an individual transmitter with its assigned auxiliary receiver.
Figure 4:
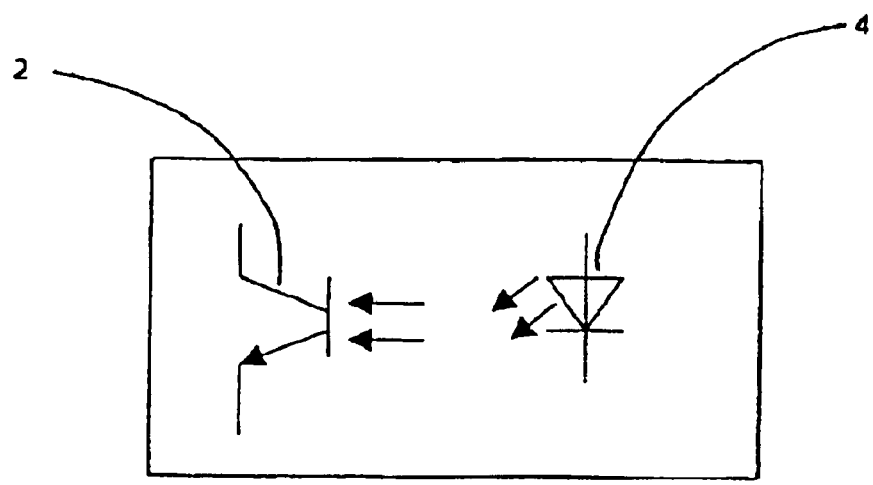
FIG. 4 shows part of the schematic circuit diagram of an individual receiver with its associated auxiliary transmitter.

This arrangement means that, when the proper circuitry according to FIGS. 3 and 4 is provided, a test mode can be initiated so that the functionality of the individual transmitters 1 within the transmitter bar 9 and of the individual receivers 2 within the receiver bar 12 can be tested.

Basically, each light-emitting diode transmits a beam which diverges at an angle such that adjacent beams overlap each other at a predetermined minimum scanning distance from the obstacle. A homogeneous and easily controlled scanning area is thus obtained. The visual field of each phototransistor also diverges at an angle such that adjacent viewing windows also overlap each other at the predetermined minimum scanning distance from the obstacle.

The light-emitting diodes are wired in series and are fed with a intermittent direct current of suitable frequency by a pulse generator, whereas the phototransistors are wired in parallel and connected to the input of an amplifier. The signals from the phototransistors are amplified and rectified and can then be used to actuate, for example, a relay. Because all the light-emitting diodes are fed with the same signals and the signal voltages from all the phototransistors are sent to the same amplifier, the radiation from any light-emitting diode can, after it has been reflected from an obstacle, actuate any phototransistor and thus drive the amplifier.

Figure 5:
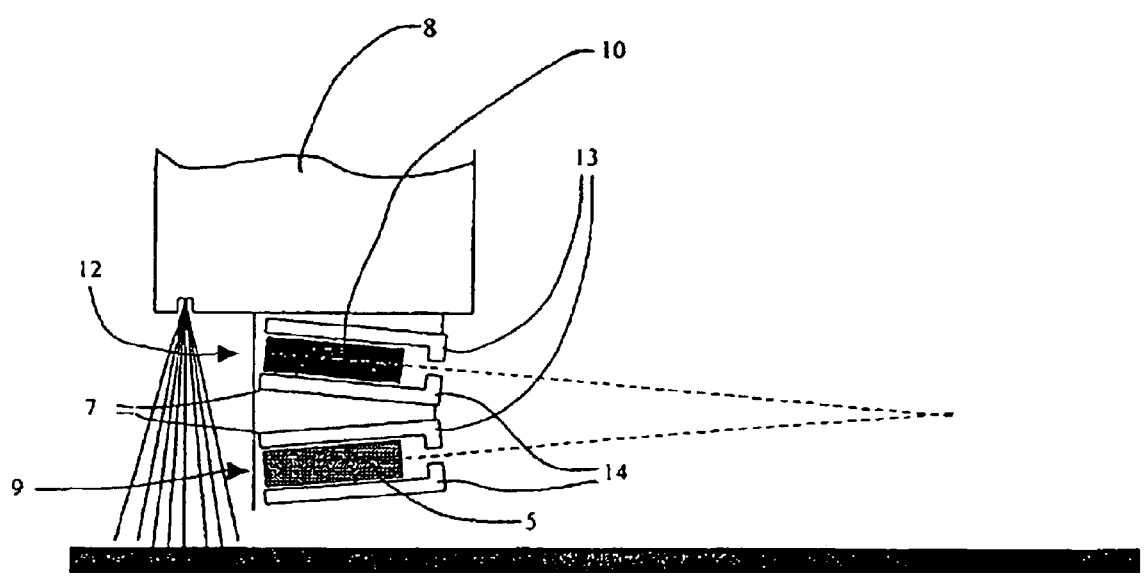
FIG. 5 shows a partial side view of a wing of a revolving door with a transmitter bar and a receiver bar mounted on the bottom.

According to FIG. 5, the sensor module 5 and the receiver module 10 are each mounted inside an extruded section 7 made of metal, preferably aluminum. The extruded section 7 is open toward the front after installation and consists of two symmetrical sidepieces 13, 14. Depending on how the section is installed, one of the two sidepieces 13 serves to attach the extruded section 7 to the wing 8. The front edge of each of the two sidepieces 13, 14 is bent over at an angle and provided with undercut channels (not shown), into which a radiation-transparent cover panel with appropriately shaped edges can be slid.

Because the extruded sections 7 are mounted in a way which allows them to be swiveled, the working points of the two bars 9 and 12 can be adjusted in ideal fashion. So-called background masking is also made possible. At the transmitter bar 9, the bent-over edges of the sidepieces 13, 14 define the direction and focus of the beams emitted by the transmitter bar 9, whereas, at the receiver bar, the bent-over edges of the sidepieces 13, 14 define the detection area and the sensitivity. The sidepieces 13, 14 also prevent an optical short circuit.

In the case of a motorized wing 8 of a door equipped with the sensor arrangement described above, the transmitter module 5 transmits a focused, oriented beam, whereupon the reflected light is evaluated. The sensitivity of the receivers 2 is adjusted in such a way that the light reflected from the floor is not sufficient to cause the receiver module 10 to send a signal. If an obstacle is present on the floor, however, the emitted light beam returns to the receiver bar 12 after traveling only a short distance, so that the overall amount of light reflected back to the receiver module 10 is increased. Thus a signal is generated. This signal is evaluated by a control unit (not shown), which then actuates the drive of the door.

What is claimed is:

1. A sensor arrangement for monitoring a spatial area in front of a motorized wing of a door, said arrangement comprising:

a plurality of primary transmitters, each transmitter emitting a beam of radiation toward a spatial area;

a plurality of primary receivers arranged to receive radiation from said primary transmitters which is reflected in said spatial area, said primary receivers generating a signal to actuate said motorized wing of said door;

a plurality of auxiliary transmitters assigned to respective said primary receivers, each said auxiliary transmitter emitting a beam of radiation toward said spatial area; and a plurality of auxiliary receivers assigned to respective said primary transmitters and arranged to receive radiation from said auxiliary transmitters which is reflected in said spatial area.

2. A sensor arrangement as in claim 1 wherein said primary transmitters and said auxiliary receivers are arranged in a first row on a common axis, each said primary transmitter being arranged next to a respective said auxiliary receiver, and said primary receivers and said auxiliary transmitters are arranged in a second row on a common axis, each said primary receiver being arranged next to a respective said auxiliary transmitter.

3. A sensor arrangement as in claim 2 wherein said primary transmitters and said auxiliary receivers are arranged in a transmitter module, each said primary transmitter being arranged next to a respective said auxiliary receiver, and said primary receivers and said auxiliary transmitters are arranged in a receiver module, each said primary receiver being arranged next to a respective said auxiliary transmitter.

4. A sensor arrangement as in claim 3 wherein at least some of said primary transmitters and at least some of said auxiliary receivers are embedded in a casting compound, and at least some of said primary receivers and at least some of said auxiliary transmitters are embedded in a casting compound.

5. A sensor arrangement as in claim 3 wherein at least some of said primary transmitters and at least some of said auxiliary receivers are installed replaceably in said transmitter module, and at least some of said primary receivers and at least some of said auxiliary transmitters are installed replaceably in said receiver module.

6. A sensor arrangement as in claim 3 further comprising a pivotably mounted extruded section in which said transmitter module is housed; and a pivotably mounted extruded section in which said receiver module is housed.

7. A sensor arrangement as in claim 3 wherein said transmitter module and said receiver module are mounted so that the beams of radiation emitted from respective said modules are at an acute angle to each other.

8. A sensor arrangement as in claim 3 further comprising a door wing having a bottom, wherein said transmitter module and said receiver module are mounted at the bottom of the wing.

9. A sensor arrangement as in claim 3 further comprising a door wing having a width, wherein said transmitter module and said receiver module are mounted to extend across the entire width of the wing.

10. A sensor arrangement as in claim 3 further comprising a revolving door having a plurality of wings, said arrangement comprising a plurality of said transmitter modules and a plurality of said receiver modules mounted on respective said wings.

11. A sensor arrangement as in claim 2 wherein said primary transmitters are designed and spaced in such a way that said beams from adjacent said primary transmitters diverge and overlap at a desired minimum distance from said spatial area; and said primary receivers have diverging viewing fields which overlap at said desired minimum distance from said spatial area.

* * * * *